1,495,673

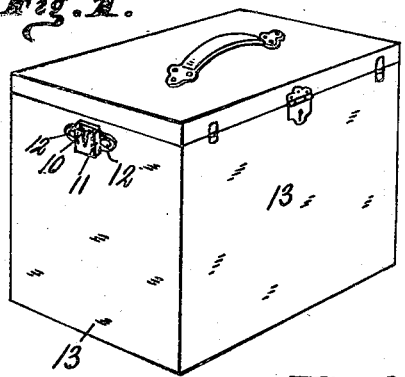
May 27, 1924.
B. L. CLIFFTON
1,495,673
PORTABLE DENTAL ENGINE FOR AN ALL CORD ELBOW ARM AND HANDPIECE
Filed April 10, 1923
Inventor.
Bacon L. Cliffton.
by William M. Gentle
his attorney
Witness:
Ellen Cate Patented May 27, 1924.

UNITED STATES PATENT OFFICE.

BACON L. CLIFFTON, OF LOS ANGELES, CALIFORNIA.

PORTABLE DENTAL ENGINE FOR AN ALL-CORD ELBOW ARM AND HANDPIECE.

Application filed April 10, 1923. Serial No. 631,060.

*To all whom it may concern:*

Be it known that I, BACON L. CLIFFTON, a citizen of the United States, residing at Los Angeles, in the county of Los Angeles and State of California, have invented a new and useful Portable Dental Engine for an All-Cord Elbow Arm and Handpiece, of which the following is a specification.

An object of the invention is to provide a light portable appliance with a driving means for smoothly and uniformly actuating rotary dental tools. To that end, I provide an appliance comprising a base with a dental motor thereon that is detachably connected to but insulated from an all cord elbow arm and hand piece; with means connected therewith for holding a relatively uniform contact of an endless cord of the elbow arm and hand piece in frictional engagement with a drive pulley on the motor so that dental tools attached to the hand piece will be driven smoothly. In other words the endless cord is held taut so that a relatively smooth uniform movement is transmitted from the motor to the tools.

An object of the invention is to provide an appliance that can be easily and quickly assembled and mounted on a dental instrument case ready for use; and that can also be demounted and stored in a dental instrument case for transportation.

An object is to provide a small appliance that is adapted for use of students, clinical demonstrations or laboratory work.

An object of the invention is to provide an appliance that is light and durable in construction; neat and pleasing in appearance and which is simple to make and assemble.

Features of the invention are shown in the construction, combination and arrangement of the parts of the appliance whereby high efficiency at low cost of construction and installation is obtained.

Other objects, advantages and features of invention may appear from the accompanying drawing. the subjoined detail description and the appended claims.

The accompanying drawing illustrates the invention.

Figure 1 is a perspective view of a dental instrument case adapted to be used in combination with the dental appliance constructed in accordance with this invention.

Fig. 2 is an end view of the instrument case open ready for attachment of the dental appliance.

Fig. 3 is a fragmental section on line 3—3, Fig. 2, with the dental appliance attached ready for use; and diagrammatically showing a battery connected to the motor; it being understood that the motor can be driven by any suitable source of electrical energy.

Fig. 4 is an enlarged fragmental section on line 4—4, Fig. 2, showing a detail of the strap for supporting the dental appliance at the end of the instrument case.

Fig. 5 is an enlarged fragmental section on line 5—5, Fig. 3, showing a plan view of the base and dental motor.

Fig. 6 is a section on line 6—6, Fig. 5, omitting the motor and instrument case, showing the motor base insulated from the post for supporting the all cord arm and hand piece.

Fig. 7 is a section on line 7—7, Fig. 3, omitting the instrument case.

Fig. 8 is an enlarged fragmental section on line 8—8, Fig. 3, showing the spring for applying tension to the endless cable.

The dental appliance comprises a base 1 that is preferably formed of aluminum so that it is light for handling and transporting, and on this base is mounted a light electrical motor 2 that can be driven from any source of power such as the battery $a$, switch $b$ and wiring $c$, $c$, shown diagrammatically in Fig. 3.

A post 3 has its lower end secured to the base 1 by the screws 3'; and to prevent an electrical current from accidentally escaping from the motor circuit to the elbow arm and hand piece the post 3 is insulated from the base by the plates $d$ and the washers $e$; and in the free end of the post there is a socket 4 that is adapted to receive the bearing pin 5 of a detachable dental elbow arm and hand piece 6.

A hanger 7 is connected to the post 3 by the screws 8; and the tongue 9 of the hanger 7 is adapted to be detachably extended into a socket 10 in a strap 11 that is secured by rivets 12 to an end of a dental instrument case 13, so that when so connected the hanger 7 will support the dental appliance in position to be operated.

The dental arm and hand piece comprises the pivot pin 5 that is connected to a body 14 that is provided with a cross spindle 15 on which are rotatably mounted the twin sheave pulleys 16 that are positioned to receive the endless cord 17 that extends around the sheave pulley 18 on the motor shaft 19.

An arm member 20 has one end connected to the body 14; and the free end of this arm is hollow so that it normally telescopes one end of another arm member 21; and interposed between shoulders on the telescoping members 20, 21 is a spring 22 that is adapted to force the member 21 away from the body 14 and thereby apply tension to the endless cord 17 when it is on the pulleys to hold it in firm, even driving engagement with the motor pulley 18.

The general construction of the part 6 is well known; there being another arm member 23 with an end pivotally connected to a block 24 that is secured to one end of the member 21 and block 24 carries twin pulleys 25 in alignment with the twin pulleys 16; also at the other end of the member 23 there is a block 26 that carries the twin pulleys 27 that are aligned with the pulley 25.

Depending from the block 26 is a support 28 on which is mounted the hand piece 29 that is provided with a pulley 30 and a tool end 31; and the endless cord 17 extends from the engine pulley 18 over the twin pulleys 17, 25, 27 to the pulley 30; and the parts are constructed and arranged so that the arm 6 can be either folded and resting on the support 32 or extended into any desired position without materially effecting the tension on the cord 17; and also arranged so that the driven cord 17 will actuate a tool in the hand piece 29.

In operation the case 13 is preferably placed on a surgical table 33 that is conveniently located adjacent an operating chair, not shown; and the dental appliance removed from the case and mounted as shown. That is, the base 1 is secured to the case 13 and the dental appliance 6 assembled and pivotally connected to the post 3 after which the arm member 21 is forced toward the body 14 and against the tension of spring 22 until the endless cord 17 which has been properly arranged over the other pulleys can be placed over the pulley 18. Then arm member 21 is released which causes the spring 22 to apply an even tension to the endless cord 17 for the purpose previously stated.

After use the dental appliance can be disconnected and enclosed in the case 13 for transporting; by which construction, combination and arrangement of parts I provide a very desirable, convenient and useful appliance for use of transient dentists, students, and work in laboratories as previously stated.

It is understood that where the dental appliance is to be used in a laboratory or lecture room that the strap 11 can be connected to a wall, table or other support so that whenever desired the appliance can be connected to the strap in the same manner and operated as when attached to the instrument case.

I claim.

1. A portable dental engine for an all cord elbow arm and hand piece comprising an instrument case; an aluminum base; a motor on said base; a driving pulley on said motor; a post on said base; means for detachably connecting said post to an instrument case; an elbow arm and hand piece pivotally connected to said post; pulleys on said elbow arm and hand piece; an endless cord on said pulleys; and means for holding said cord taut on said driving pulley.

2. A portable dental engine for an all cord elbow arm and hand piece comprising an instrument case; an aluminum base adapted to be carried in said case; a motor on said base; a drive pulley on said motor; a post mounted on and insulated from said base; said post having a hanger secured thereto by which said post and base are suspended from the end of said case; an elbow arm and hand piece detachably connected to said post; pulleys on said elbow arm and hand piece; a flexible member on said pulleys said member in driving engagement with said drive pulley; and means for holding said member taut on said driving pulley.

3. A portable dental engine for an all cord elbow arm and hand piece comprising an instrument case; an aluminum base adapted to be transported in said instrument case; means for supporting said base at an end of said instrument case; a motor on said base; a dental device detachably connected to said base; a detachable driving connection between said motor and device; and means for insulating said dental device from said base and motor so that an electrical current cannot accidentally escape from said motor to said dental device.

In testimony whereof, I have hereunto set my hand at Los Angeles, California, this 3d day of April, 1923.

BACON L. CLIFFTON.

Witness:
W. M. GENTLE.